US012535094B2

(12) United States Patent
Benoit

(10) Patent No.: US 12,535,094 B2
(45) Date of Patent: Jan. 27, 2026

(54) TUBE FASTENER SYSTEM

(71) Applicant: Illinois Tool Works Inc., Glenview, IL (US)

(72) Inventor: Thomas A. Benoit, Bourbonnais, IL (US)

(73) Assignee: Illinois Tool Works Inc., Glenview, IL (US)

( * ) Notice: Subject to any disclaimer, the term of this patent is extended or adjusted under 35 U.S.C. 154(b) by 315 days.

(21) Appl. No.: 18/200,738

(22) Filed: May 23, 2023

(65) Prior Publication Data

US 2023/0417265 A1     Dec. 28, 2023

Related U.S. Application Data

(60) Provisional application No. 63/355,326, filed on Jun. 24, 2022.

(51) Int. Cl.
*F16B 2/22* (2006.01)
*F16B 9/00* (2006.01)
*F16L 3/13* (2006.01)
*B33Y 80/00* (2015.01)

(52) U.S. Cl.
CPC ............... *F16B 9/05* (2018.08); *F16B 2/22* (2013.01); *F16L 3/13* (2013.01); *B33Y 80/00* (2014.12); *Y10T 403/7188* (2015.01)

(58) Field of Classification Search
CPC ......... Y10T 403/7111; Y10T 403/7188; Y10T 403/7171; F16B 2/22; F16L 3/13
See application file for complete search history.

(56) References Cited

U.S. PATENT DOCUMENTS

| 4,717,100 | A | 1/1988 | Klein |
| 5,291,639 | A | 3/1994 | Baum |
| 6,290,201 | B1 | 9/2001 | Kanie |
| 6,450,459 | B2 | 9/2002 | Nakanishi |
| 6,779,763 | B2 * | 8/2004 | Miura ............... F16L 3/223 248/68.1 |
| 6,915,990 | B2 | 7/2005 | Maruyama |

(Continued)

FOREIGN PATENT DOCUMENTS

| AT | 524862 A4 | 10/2022 |
| CN | 104534178 A | 4/2015 |

(Continued)

OTHER PUBLICATIONS

Examination report dated Jan. 30, 2024 in German application No. 10 2023 113 335.7 (7 pages).

*Primary Examiner* — Michael P Ferguson
(74) *Attorney, Agent, or Firm* — McAndrews, Held & Malloy, Ltd.

(57) ABSTRACT

Described is a tube fastener for securing at least one tube relative to a component. The tube fastener includes a bridge portion and a fastener portion. The bridge portion is configured to secure the at least one tube relative to one another via at least one tube pocket. Each of the at least one tube pocket comprises a crimp feature configured to provide resistance to slide forces imparted on the at least one tube. The fastener portion defines a central longitudinal axis and is configured to engage the component via an opening. The tube fastener can be fabricated as a unitary structure via an additive manufacturing technique.

20 Claims, 10 Drawing Sheets

(56) References Cited

U.S. PATENT DOCUMENTS

| | | | |
|---|---|---|---|
| 7,036,775 B2 * | 5/2006 | Nakanishi | F16L 3/227 |
| | | | 248/68.1 |
| 7,059,022 B2 | 6/2006 | Yuta | |
| 7,086,630 B2 | 8/2006 | Maruyama | |
| 7,887,012 B2 * | 2/2011 | Desai | F16L 3/1075 |
| | | | 248/68.1 |
| 8,579,570 B2 | 11/2013 | Fellows | |
| 8,684,321 B2 | 4/2014 | Shirakabe | |
| 8,753,055 B2 | 6/2014 | Ruckel | |
| 8,979,461 B2 | 3/2015 | Pearson | |
| 9,383,041 B2 * | 7/2016 | Kanie | F16L 3/1218 |
| 9,453,593 B2 * | 9/2016 | Pearson | F16L 3/1075 |
| 9,494,258 B2 * | 11/2016 | Flynn | F16L 3/237 |
| 10,018,214 B2 | 7/2018 | Yon | |
| 10,119,631 B2 * | 11/2018 | Toll | F16L 3/1058 |
| 10,385,901 B2 | 8/2019 | Steltz | |
| 10,527,202 B2 * | 1/2020 | Kanie | F16L 3/13 |
| 10,723,291 B2 * | 7/2020 | Leancu | F16L 3/223 |
| 11,365,840 B2 | 6/2022 | Gauthier | |
| 2019/0040982 A1 | 2/2019 | Cantrell | |
| 2023/0349407 A1 | 11/2023 | Lepper | |
| 2023/0383868 A1 | 11/2023 | Lee | |
| 2023/0417265 A1 | 12/2023 | Benoit | |

FOREIGN PATENT DOCUMENTS

| | | | | |
|---|---|---|---|---|
| DE | 4123430 C1 | 6/1992 | | |
| DE | 10230747 B3 | 4/2004 | | |
| DE | 102005056777 B3 | 11/2006 | | |
| DE | 102006013899 B3 | 11/2006 | | |
| DE | 102009011864 A1 | 9/2010 | | |
| DE | 102012012574 A1 | 10/2013 | | |
| DE | 102015016710 B3 | 1/2017 | | |
| DE | 102018219440 A1 | 5/2020 | | |
| DE | 202020103903 U1 | 7/2020 | | |
| EP | 1445845 A2 | 8/2004 | | |
| EP | 3573205 A1 | 11/2019 | | |
| EP | 3943795 A1 | 1/2022 | | |
| EP | 4060217 A1 | 9/2022 | | |
| FR | 3 010 465 | * | 3/2015 | F16B 2/22 |
| FR | 3131761 A1 | 7/2023 | | |

* cited by examiner

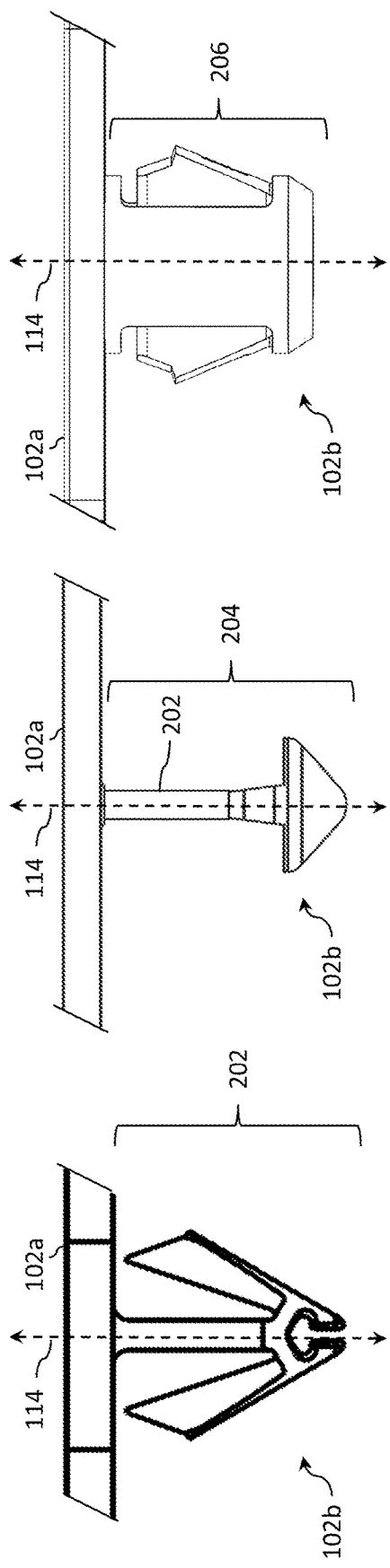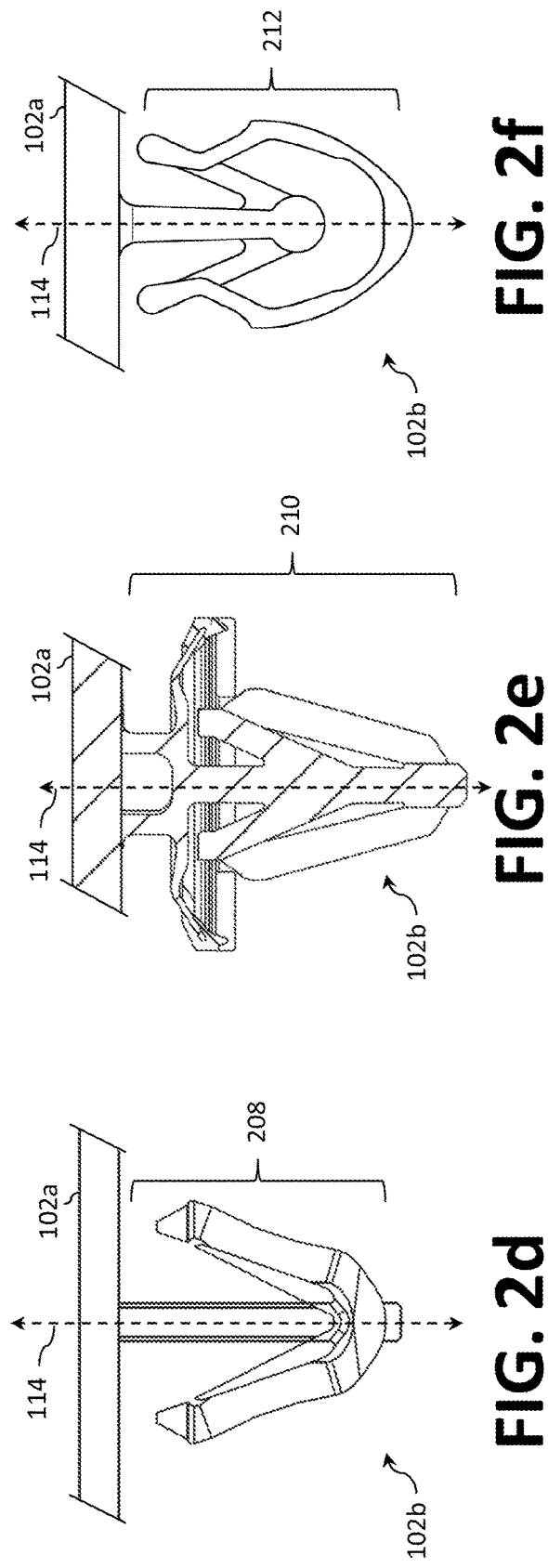

TUBE FASTENER SYSTEM

RELATED APPLICATION

The present application claims priority to U.S. Provisional Patent Application No. 63/355,326, filed Jun. 24, 2022, and entitled "Tube Fastener System," which is hereby incorporated by reference in its entirety.

BACKGROUND

Automotive components require fastening techniques that are simple to manufacture and assemble. Further, fastening techniques should above all be reliable and efficient.

In some instances, objects need to be secured to the vehicle to mitigate movement and/or shifting during operation, which can result in damage or kinking to the object. For example, tube, hoses, wires, and other conduits are often secured to the vehicle components. However, while such objects are secured in 4 degrees of freedom, the objects can sometimes slide. Therefore, despite advancements to date, it would be desirable to have a tube fastener assembly with improved assembly characteristics that mitigates such slippage.

SUMMARY

The present disclosure relates generally to a fastening system to form a connection between the components, such as tubes and automotive panels, using a tube fastener with improved characteristics, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 2a through 2f illustrate additional fastener styles suitable for coupling the bridge portion with the component in accordance with other aspects of this disclosure.

FIG. 3a illustrates a topside isometric view of the tube fastener of FIGS. 1a and 1b, while

DESCRIPTION

Figure 1A:
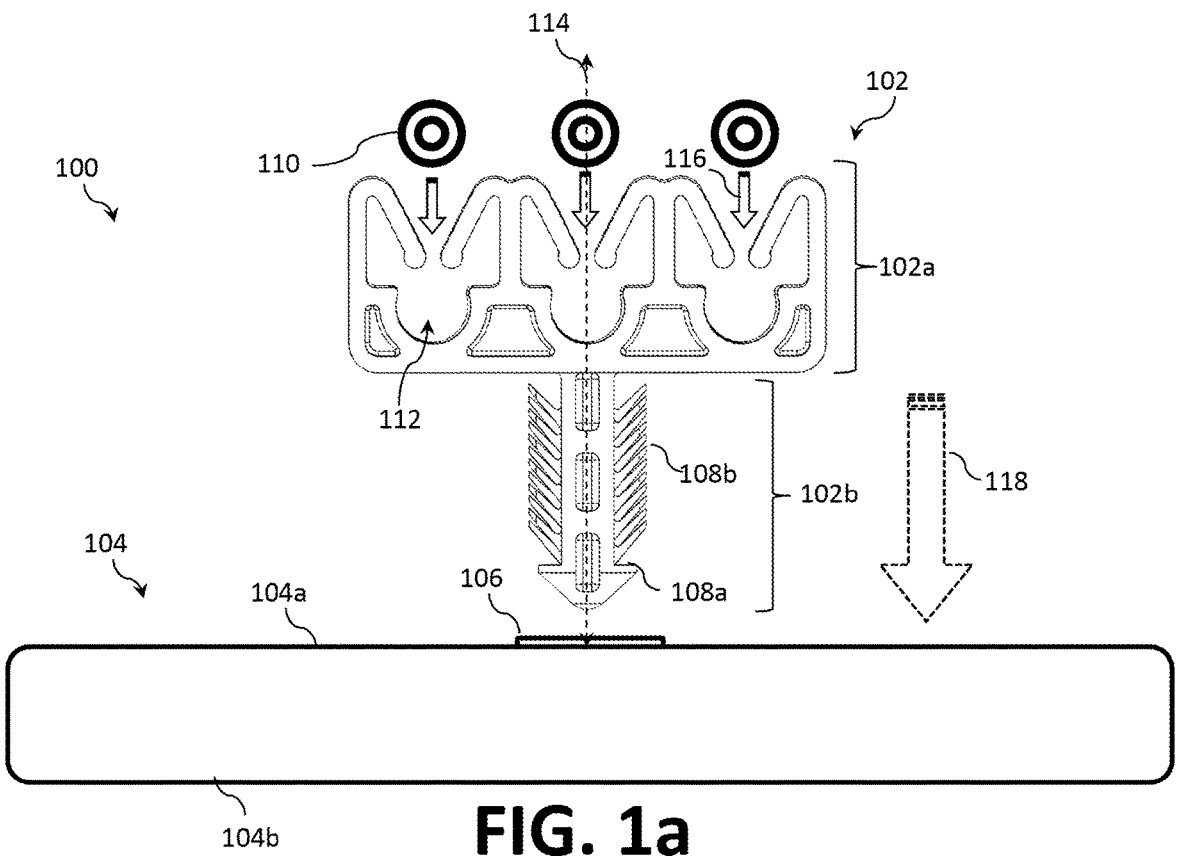
FIGS. 1a and 1b illustrate a fastening system configured to secure one or more tubes relative to a component via a tube fastener in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

A tube fastener can be used to couple an object to a component, such as automotive components. In one example, a tube fastener for securing at least one tube relative to a component comprises a bridge portion and a fastener portion. The bridge portion is configured to secure the at least one tube relative to one another via at least one tube pocket. Each of the at least one tube pocket comprises a crimp feature configured to provide resistance to slide forces imparted on the at least one tube. The fastener portion defines a central longitudinal axis. The fastener portion is configured to engage the component via an opening.

In some examples, the bridge portion and the fastener portion are fabricated as a unitary structure via an additive manufacturing technique. In some examples, the crimp feature comprises a convex feature and a concave feature. In some examples, the convex feature and the concave feature are complimentary to one another. In some examples, the convex feature is an outward curve, bump, or protrusion formed on an interior surface of the at least one tube pocket. In some examples, the concave feature is an inward curve, dimple, or recess formed in an interior surface of the at least one tube pocket.

In some examples, the bridge portion further comprises at least one tube retainer configured to prevent the at least one tube from exiting the at least one tube pocket. In some examples, the at least one tube retainer comprises a divider and one or more wings. In some examples, each of the one or more wings is resiliently connected to the divider and configured to deflect as the at least one tube is passed into the at least one tube pocket. In some examples, each of the one or more wings comprises a foot position at a distal end thereof.

In some examples, each of the one or more wings defines one or more windows. For example, the bridge portion can include a body that defines one or more windows. In some examples, the fastener portion comprises a first plurality of fins distributed along the central longitudinal axis to define a first fin tier. In some examples, the fastener portion comprises a second plurality of fins distributed along the central longitudinal axis to define a second fin tier that is offset relative to the first fin tier by a distance.

Figure 1B:
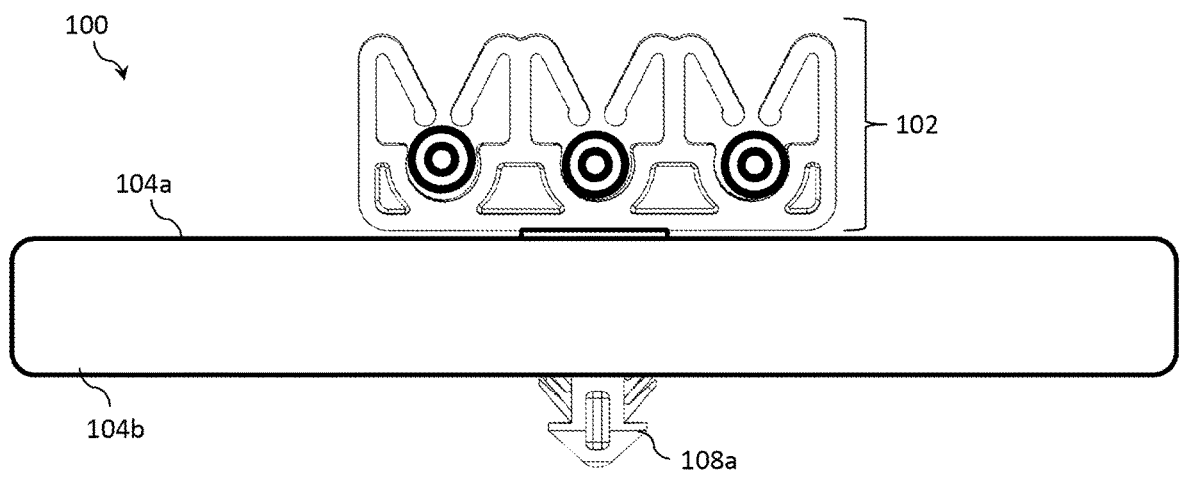

FIGS. 1a and 1b illustrate side views of an example fastening system 100 configured to secure one or more tubes 110 relative to a component 104 via a tube fastener 102. The one or more tubes 110 may be, for example, brake lines, fuel lines, cables (e.g., electric cables), pipes, and/or any other tubular structure that may be secured to a component 104. As illustrated, the component 104 defines an A-side surface 104a (e.g., a first surface, such as an exterior surface) and a B-side surface 104b (e.g., a second surface, such as an interior surface). The one or more tubes 110 are illustrated as being secured to the A-side surface 104a.

The component 104 may be, for example, an automotive panel, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like. Depending on the application, the component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. The component 104 may include, define, or otherwise provide an opening 106 (e.g., a hole), which may be formed during manufacturing of the component 104.

The tube fastener 102 may include, define, or otherwise provide a bridge portion 102a and a fastener portion 102b. The bridge portion 102a is configured to couple with and/or secure the tubes 110 relative to one another and, ultimately, the component 104. For example, the bridge portion 102a is illustrated with a plurality of pockets 112, each of which is configured to secure a tube 110. As illustrated, each of the plurality of pockets 112 can be shaped as a channel that generally corresponds to the diameter of the tubes 110. A tube 110 can be inserted into and secured within each of the plurality of pockets 112 by pushing the tube 110 toward the respective tube pocket 112 in the direction indicated by arrow 116. While three pockets 112 are illustrated, additional or fewer pockets 112 may be provided depending on the design needs (e.g., the number of tubes 110 that need to be secured). The width of the bridge portion 102a would be adjusted accordingly to accommodate the desired number of pockets 112 and/or tubes 110.

The fastener portion 102b of the illustrated tube fastener 102 serves to couple the bridge portion 102a to the component 104. As illustrated, the fastener portion 102b is generally perpendicular to the bridge portion 102a such that a central longitudinal axis 114 runs down the center of the fastener portion 102b. The fastener portion 102b is illustrated as a push-pin assembly (sometimes called trees, pine trees, Christmas trees, etc.) that comprises a plurality of fins 108b distributed or otherwise arranged along a length of the body 108a of the fastener portion 102b. The fins 108b may be shaped as blades, teeth, barbs, or the like. As illustrated, the fins 108b are angled away from the central longitudinal axis 114 and are configured to deflect inward toward the central longitudinal axis 114 as the fastener portion 102b is passed through the opening 106 in the component 104. The fins 108b are angled upwardly relative to the central longitudinal axis 114 (forming an acute angle between each fin 108b and the central longitudinal axis 114) to resist pullout forces. To form the connection with the component 104, the fastener portion 102b of the tube fastener 102 is inserted into an opening 106 formed in or on a surface of the component 104 as indicated by the arrow 118. In some examples, the fastener portion 102b can extend beyond the component 104 to exit and protrude from the B-side surface 104b as best illustrated in FIG. 1b.

The fastener portion 102b can be integrated with the bridge portion 102a or attached during assembly (e.g., via adhesives, a welding process, a mechanical coupling, or the like). In some examples, the tube fastener 102 may include additional features, such as ribs and wings to mitigate noise and/or rattle between the tube fastener 102 and the component 104. In other examples, depending on the material type, the fastener portion 102b can be omitted and bridge portion 102a may be formed on or integrated with the component 104 during manufacturing of the component 104, whether via printing (e.g., an addition manufacturing process), molding, or layup. By integrating the tube fastener portion 102b with the component 104, the fastening system 100 eliminates setup variation, reduces the number of parts (and part numbers), and obviates the needs for the fastener portion 102b. Similarly, in some applications, it may be desirable to secure a plurality of tubes 110 relative to one another, but not necessary to secure them to the component 104. In such cases, the fastener portion 102b can be omitted.

The tube fastener 102 may be formed as a unitary structure. For example, the tube fastener 102 may be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, the tube fastener 102 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

Additive manufacturing techniques print objects in three dimensions, therefore both the minimum feature size (i.e., resolution) of the X-Y plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (DPI) or micrometers (μm). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). A printing process in a higher vertical resolution printing, however, will take longer to produce finer layers as the printer has to produce more layers. In some examples, the tube fastener 102 may be formed or otherwise fabricated at different resolutions during a printing operation. For example, the bridge portion 102a (or portions thereof) may be printed at a higher resolution than that of the fastener portion 102b or vice versa as needed for a particular application.

While it is contemplated that all portions of the tube fastener 102 would be formed during the same printing session (i.e., printed during the same printing operation), it is possible that the tube fastener 102 may be printed in two sessions. For example, the bridge portion 102a may be printed with one or more landmark structures (e.g., a protrusion or a recess) during a first session that can be located and filled and/or surrounded with material during a second session to form the fastener portion 102b.

While the fastener portion 102b is illustrated in most figures as a push-pin fastener, other fastener designs are contemplated. For example, FIGS. 2a through 2f illustrate additional fastener styles that can be used as the fastener portions 102b suitable for coupling the bridge portion 102a with the component 104. Specifically, FIGS. 2a through 2f illustrate, respectively, a W-shaped clip fastener 202 (illustrated as a 2-legged clip fastener), pin fastener 204, a box-prong fastener 206 (illustrated as a 2-legged box-prong fastener), a specialty clip assembly 208 (e.g., a CenterLok™ fastener, which is available from Deltar®), a clip assembly with four retaining legs 210, and an clip assembly with two snap-engaging seats 212. The clip assembly with four retaining legs 210, which is illustrated in FIG. 2e as a cross sectional view, is further described in connection with commonly-owned U.S. Pat. No. 10,385,901 to Jeffrey J. Steltz. The clip assembly with two snap-engaging seats 212 of FIG. 2f is further described in connection with commonly-owned U.S. Pat. No. 10,018,214 to Fulvio Pacifico Yon.

Figure 3A:
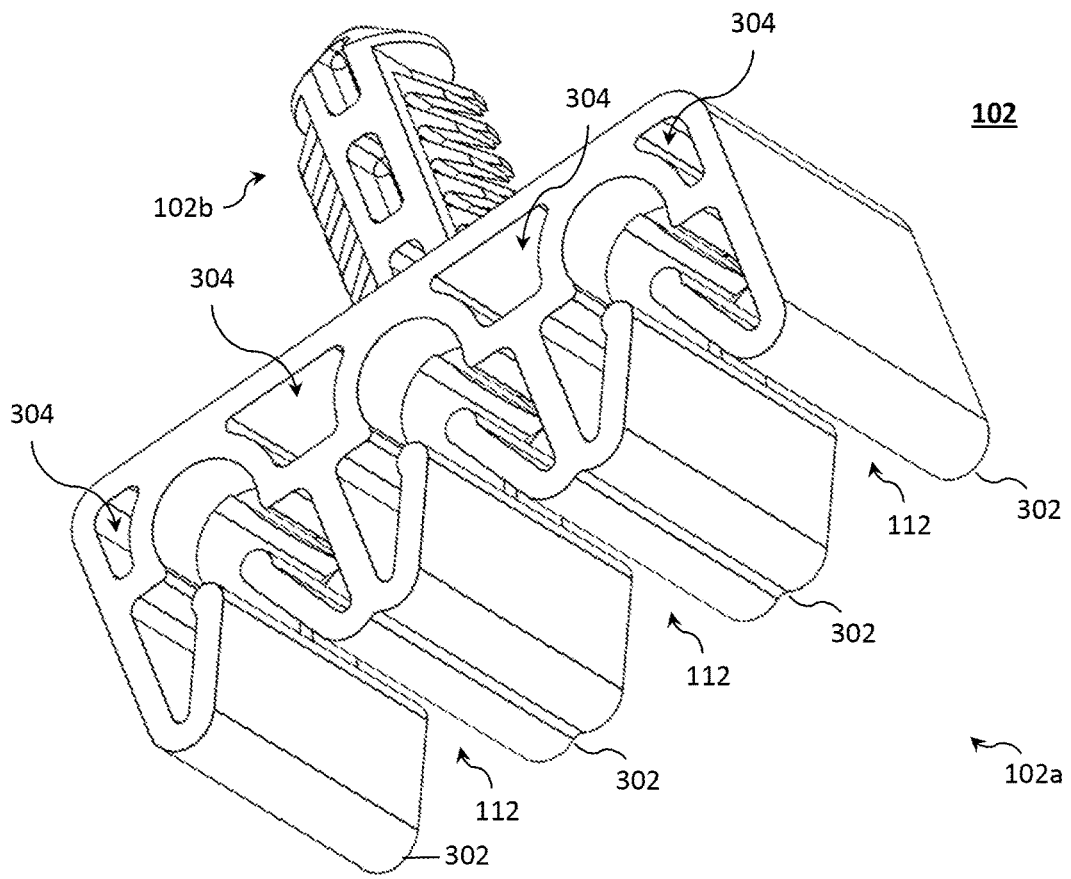
Figure 3B:
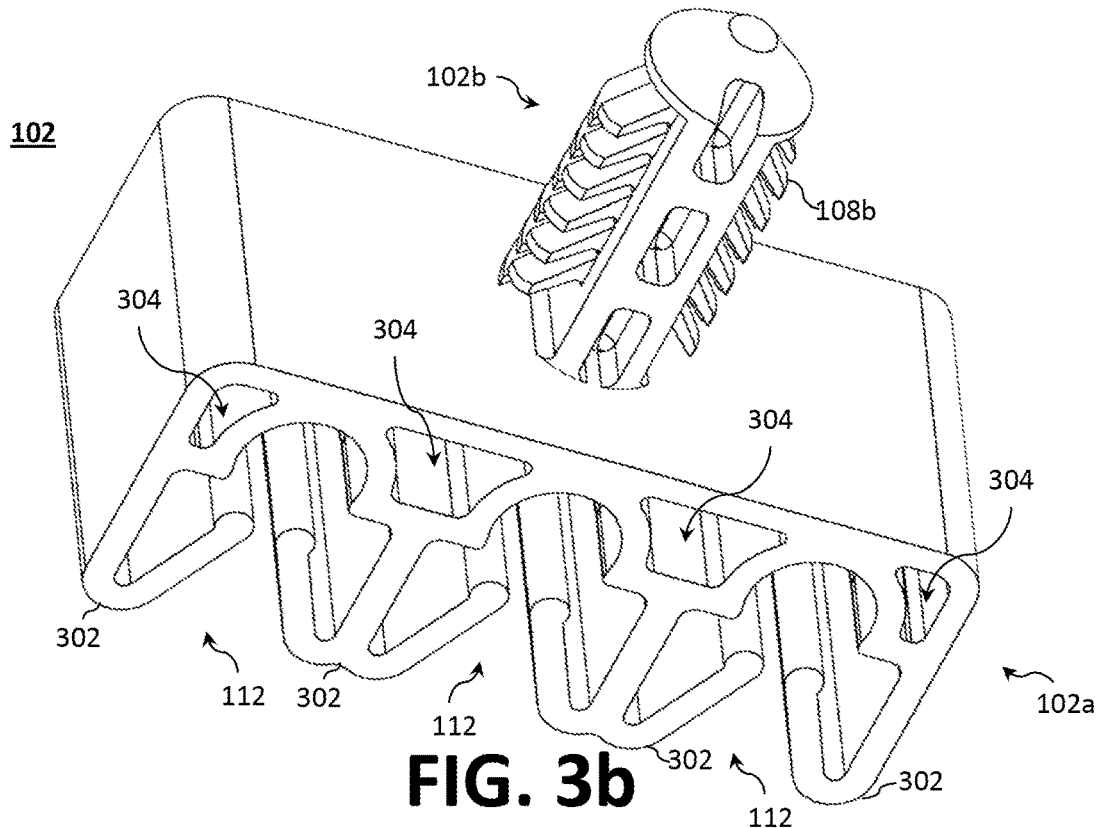
FIG. 3b illustrates an underside isometric view thereof.
Figure 3C:
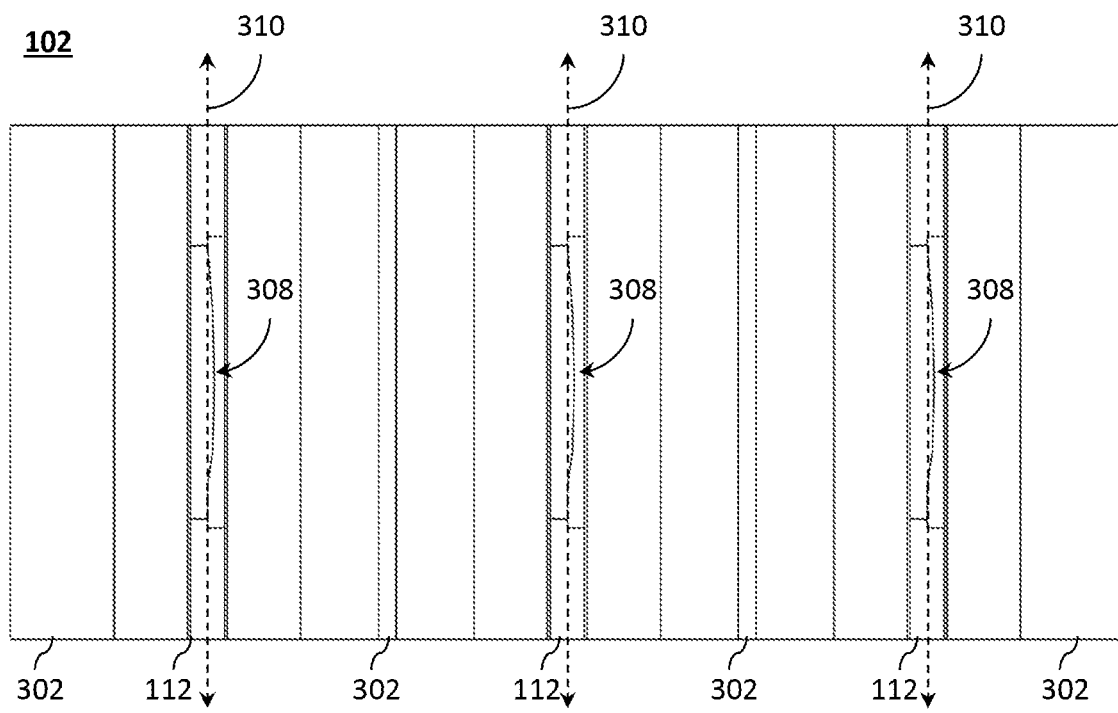
FIGS. 3c and 3d illustrate, respectively, top plan and bottom plan views of the tube fastener.
Figure 3D:
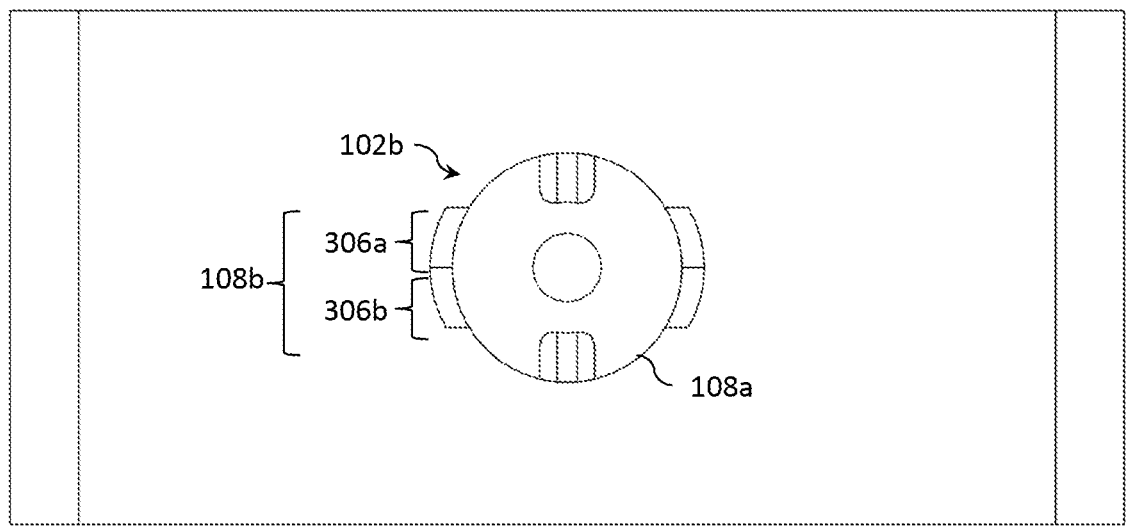
Figure 3E:
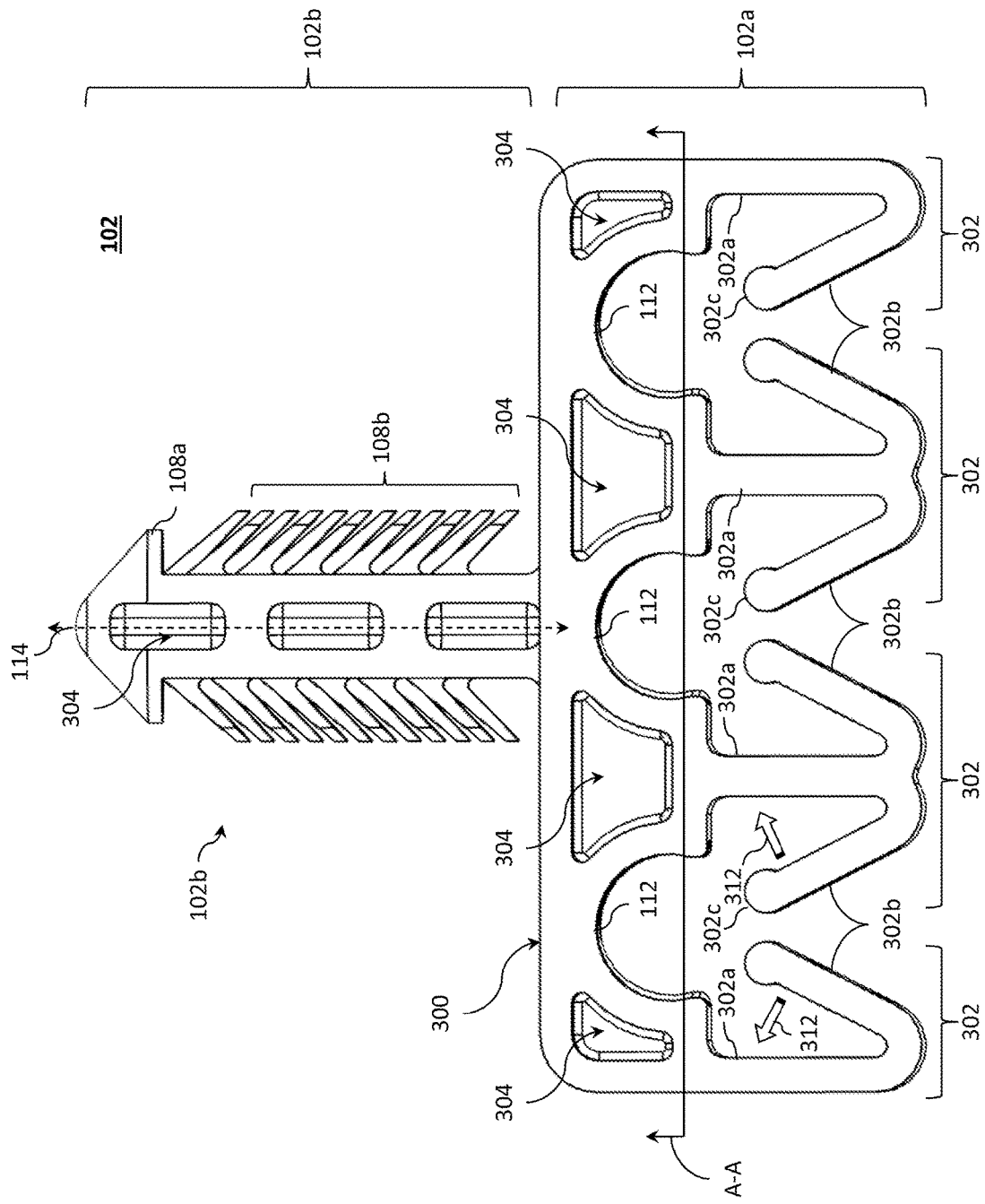
FIGS. 3e and 3f illustrate, respectively, front and side elevation views of the tube fastener.
Figure 3F:
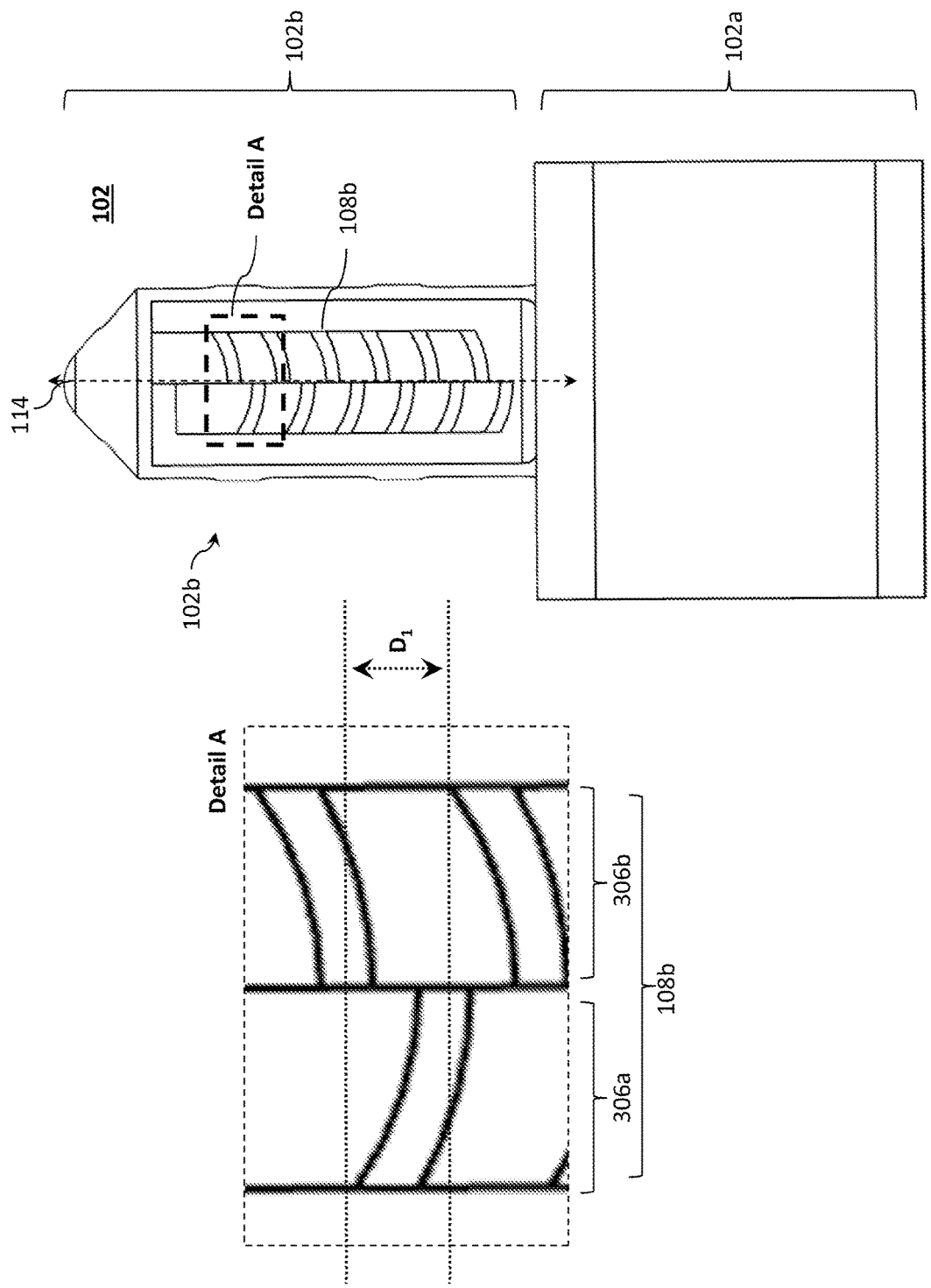
Figure 3G:
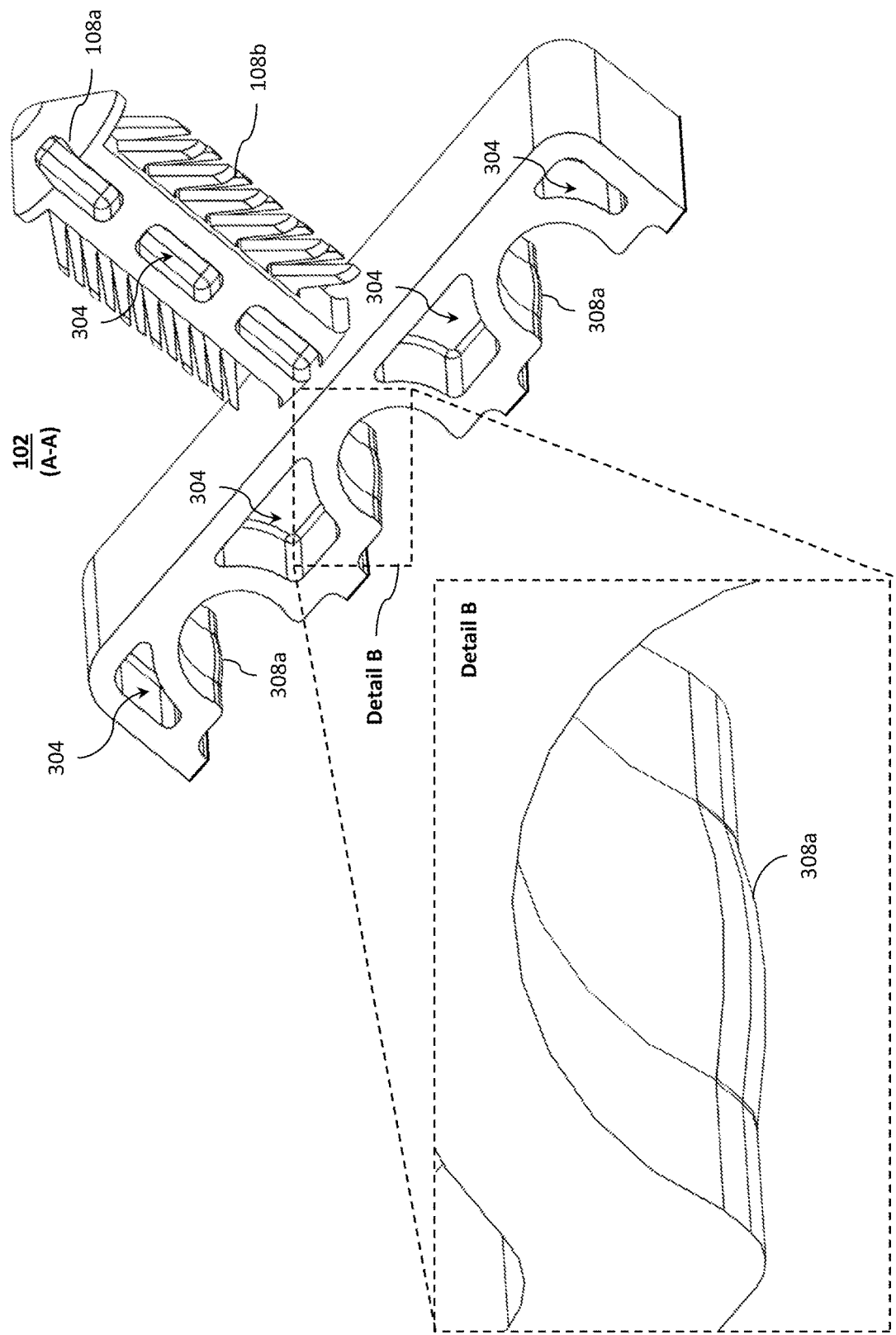
FIGS. 3g and 3h illustrate, respectively, topside and underside isometric views of the tube fastener with detailed views of the tube pocket.
Figure 3H:
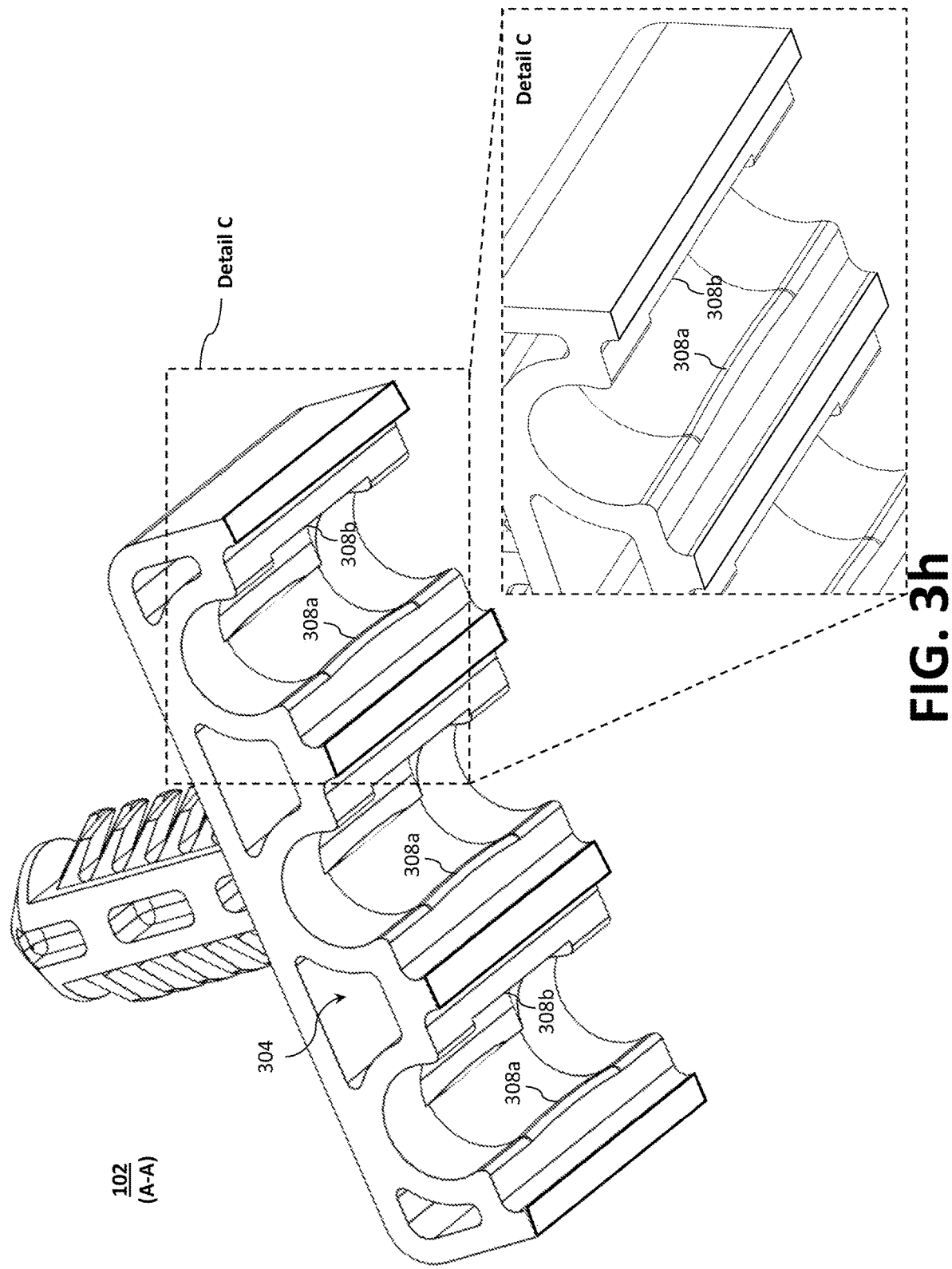
Figure 3I:
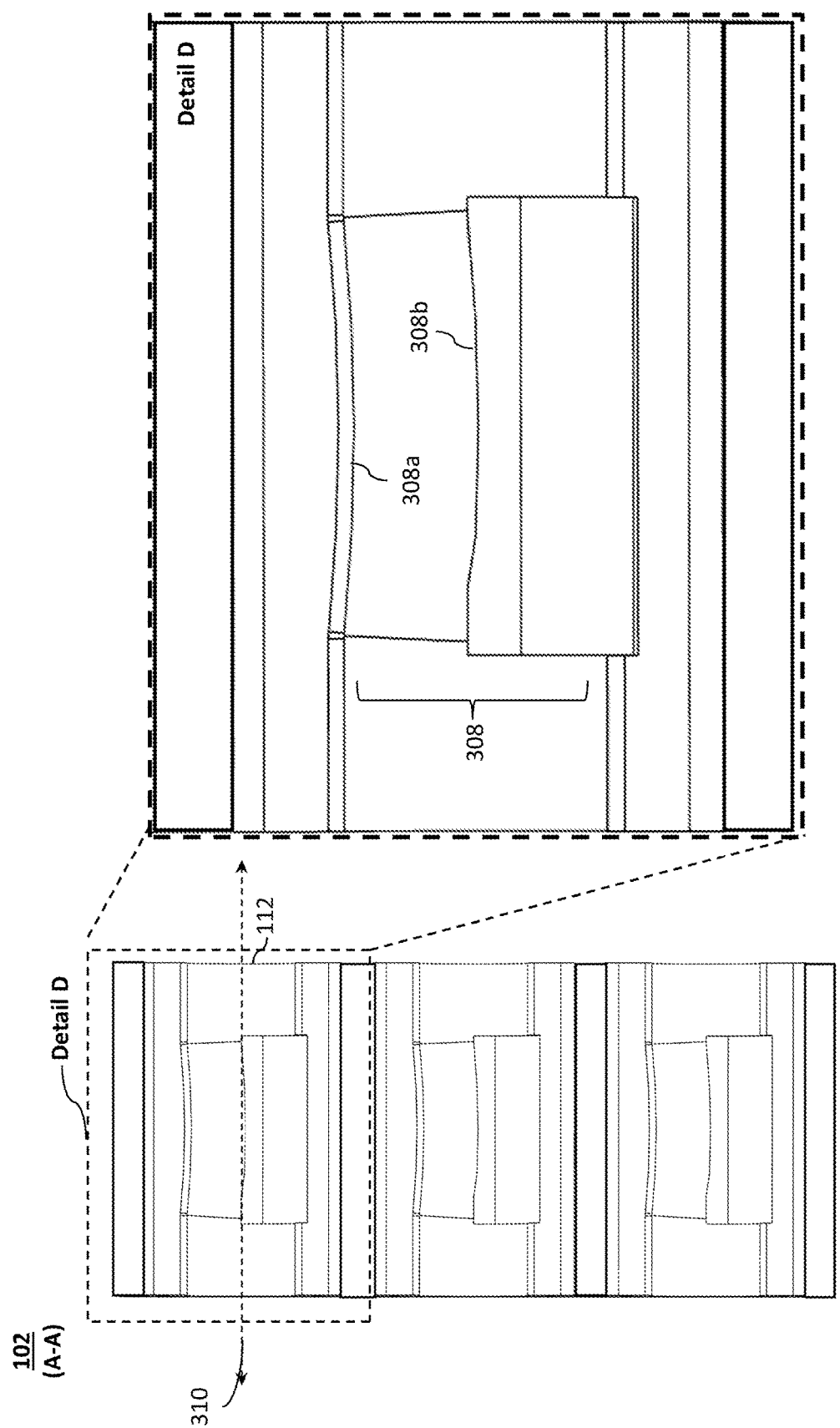
FIG. 3i illustrates a bottom plan view of the tube fastener with a detailed view of the tube pocket.

FIGS. 3a through 3i illustrate the example tube fastener 102 of FIGS. 1a and 1b in greater detail. FIG. 3a illustrates a topside isometric view of the tube fastener 102, while FIG. 3b illustrates an underside isometric view thereof. FIGS. 3c and 3d illustrate, respectively, top plan and bottom plan views of the tube fastener 102. FIGS. 3e and 3f illustrate, respectively, front and side elevation views of the tube fastener 102. FIGS. 3g and 3h illustrate, respectively, topside and underside isometric views of the tube fastener 102 with detailed views of the tube pocket 112. FIG. 3i illustrates a bottom plan view of the tube fastener 102 with a detailed view of the tube pocket 112. The views of FIGS. 3g through 3i are taken along the cutline A-A of FIG. 3e. As described above, the tube fastener 102 is configured to receive one or more tubes 110 via the bridge portion 102a and to engage the component 104 via the fastener portion 102b and the opening 106.

As illustrated, the bridge portion 102a comprises a plurality of pockets 112 and a plurality of tube retainers 302. Each of the plurality of pockets 112 defines a central axis 310 that is perpendicular to the central longitudinal axis 114. When a tube 110 is inserted into the tube pocket 112, the length of the tube 110 aligns and/or is parallel to the central axis 310. In some examples, the tube fastener 102 comprises one or more windows 304 (e.g., cut outs or openings) formed in or on body 300 the bridge portion 102a and/or fastener portion 102b. For example, the body of the bridge portion 102a may be formed with one or more windows 304 that serve to reduce the amount of material needed to fabricate the tube fastener 102, thus reducing material cost and part weight.

As illustrated, each of the plurality of pockets 112 is positioned between a set of tube retainers 302, which serve to prevent the tubes 110 from exiting the tube pocket 112. For example, the tube retainers 302 impart a force on the tube 110 in the direction indicated by arrow 116 to maintain the tube 110 in the tube pocket 112 (e.g., pressing the tube 110 into the tube pocket 112). In some examples, the tube retainers 302 can be embodied as "rabbit ears." In the illustrated example, each of the tube retainers 302 comprises a divider 302a and one or more wings 302b. Each of the tube pockets 112 is separated from adjacent tube pockets 112 by a divider 302a. The one or more wings 302b are resiliently coupled to a distal end of the divider 302a and configured to deflect as indicated by arrow 312 as the tube 110 is passed into the tube pocket 112. The one or more wings 302b are relatively rigid towards forces that oppose the direction indicated by the arrow 312 and, as such, will lock the tube 110 into the tube pocket 112. A foot 302c is formed or located at an end of the wing 302b and configured to contact the tube 110. The foot 302c may be rounded or otherwise shaped (e.g., blunt) to mitigate damage to the tube 110.

Between the shape of the tube pocket 112 and the tube retainers 302, movement of the tube 110 is restricted in four degrees of freedom, but the tube 110 could still slide or slip relative to the tube pocket 112 (i.e., parallel to central axis 310). During operation, the tube 110 can become subject to an amount of force that could initiate sliding of the tube 110 axially within the tube pocket 112. To prevent such slippage, the tube pocket 112 may include or define a crimp feature 308. The crimp feature 308 provides resistance to such slide forces. For example, the crimp feature 308 may comprise a convex feature 308a (e.g., one or more protrusions or bumps) and/or a complimentary concave feature 308b (e.g., one or more recesses or dimples) that collectively provide a slight crimp to the tube 110 within the tube pocket 112. In the illustrated examples, the profile or shape of the convex feature 308a and the concave feature 308b are generally complementary to one another. An example crimp feature 308 is best illustrated in Details B, C, and D of FIGS. 3g, 3h, and 3i, respectively.

The convex feature 308a can be embodied as an outward curve, bump, or similar protrusion formed on the interior surface of a wall of the tube pocket 112 that extends toward the central axis 310. The concave feature 308b can be embodied as an inward curve, dimple, or similar recessed within the interior surface of the wall of the tube pocket 112 that extends away the central axis 310. While each of the figures illustrates a tube pocket 112 having both a convex feature 308a and a concave feature 308b, the concave feature 308b can be omitted if desired; however, providing both a convex feature 308a and a concave feature 308b offers certain benefits. For example, the concave feature 308b provides a space for the tube 110 to reside when pushed or deflected by the convex feature 308a, thus mitigating risk of the tube 110 becoming kinked by the convex feature 308a in a manner that could affect functionality (e.g., flow) of the tube 110.

As previously mentioned, the fastener portion 102b is illustrated as a push-pin assembly that comprises a plurality of fins 108b arranged along a length of the body 108a of the fastener portion 102b. The plurality of fins 108b can be arranged along the length of the body 108a in a first fin tier

306a and a second fin tier 306b. As best illustrated in Detail A (FIG. 3f), the first fin tier 306a is offset along the length of the body 108a relative to the second fin tier 306b by a distance (Di). Offsetting the first fin tier 306a relative to the second fin tier 306b by distance Di allows for finer iterations of component thicknesses. The leading end of the fastener portion 102b can be rounded, tapered, or otherwise shaped to increase ease of insertion into the opening 106 by helping to align and guide the fastener portion 102b into the opening 106.

Figure 4:
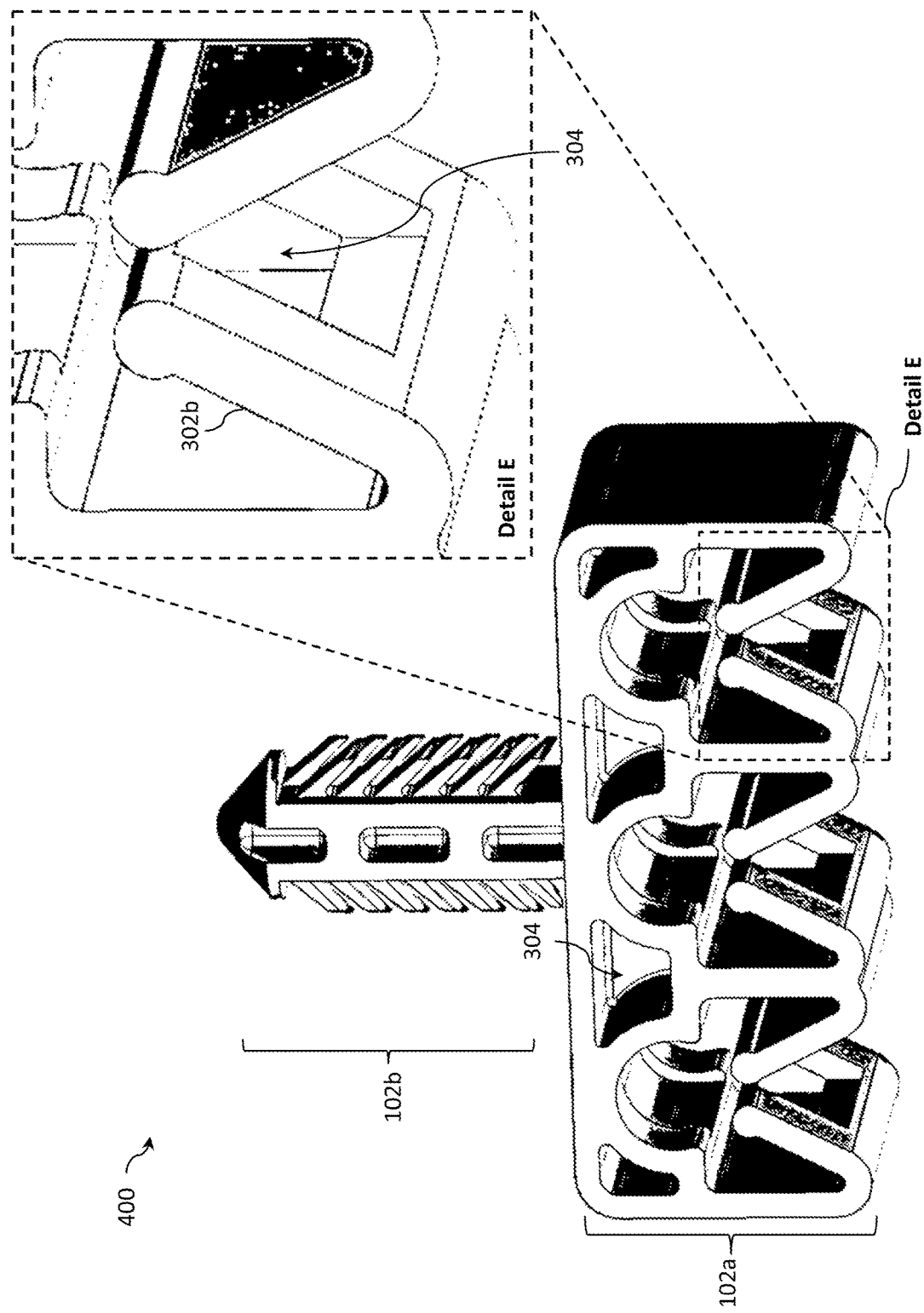
FIG. 4 illustrates a topside isometric view of the tube fastener in accordance with other aspects of this disclosure.

FIG. 4 illustrate another example tube fastener 400. The example tube fastener 400 of FIG. 4 is substantially the same as the tube fastener 102 of the previous Figures, except that each of the wings 302b are formed with a window 304 to further reduce the amount of material used and overall weight. In the illustrated example, the one or more windows 304 are formed on the planar portion of the wing 302b between the foot 302c and the connection (e.g., pivot point) with the divider 302a. An example window 304 is illustrated in Detail E of FIG. 4. The illustrated window 304 is rectangular, but other shapes are contemplated.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A tube fastener for securing at least one tube relative to a component, the tube fastener comprising:
a bridge portion configured to secure the at least one tube via at least one tube pocket,
wherein each of the at least one tube pocket includes a tubular-shaped inner surface,
wherein each of the at least one tube pocket extends longitudinally from one end of the bridge portion to an opposite end of the bridge portion,
wherein each of the at least one tube pocket includes a longitudinal opening extending along an entirety of the tube pocket disposed on one side of the bridge portion,
wherein each of the at least one tube pocket comprises a crimp feature configured to provide resistance to slide forces imparted on the at least one tube,
wherein the crimp feature includes an arcuate convex feature that protrudes radially inwardly into and circumferentially about a given tube pocket,
wherein the crimp feature includes an arcuate concave feature that recedes outwardly from and circumferentially about a given tube pocket, and
wherein the concave feature is opposite the convex feature such that a radial cross-sectional profile of a given tube pocket is asymmetrical; and
a fastener portion defining a central longitudinal axis disposed on a side of the bridge portion opposite the opening to the at least one tube pocket and extending therefrom, wherein the fastener portion is configured to engage the component via an opening.

2. The tube fastener of claim 1, wherein the bridge portion and the fastener portion are fabricated as a unitary structure via an additive manufacturing technique.

3. The tube fastener of claim 1, wherein the bridge portion further comprises at least one tube retainer configured to prevent the at least one tube from exiting the at least one tube pocket.

4. The tube fastener of claim 3, wherein the at least one tube retainer comprises a divider and one or more wings.

5. The tube fastener of claim 4, wherein each of the one or more wings is resiliently connected to the divider and configured to deflect as the at least one tube is passed into the at least one tube pocket.

6. The tube fastener of claim 4, wherein each of the one or more wings comprises a foot position at a distal end thereof.

7. The tube fastener of claim 4, wherein each of the one or more wings defines one or more windows.

8. The tube fastener of claim 1, wherein the bridge portion includes a body that defines one or more windows.

9. The tube fastener of claim 1, wherein the fastener portion comprises a first plurality of fins distributed along the central longitudinal axis to define a first fin tier.

10. The tube fastener of claim 9, wherein the fastener portion comprises a second plurality of fins distributed along the central longitudinal axis to define a second fin tier that is offset relative to the first fin tier by a distance.

11. A tube fastener for securing at least one tube relative to a component, the tube fastener comprising:
a bridge portion configured to secure the at least one tube via at least one tube pocket,
wherein each of the at least one tube pocket includes a tubular-shaped inner surface,
wherein each of the at least one tube pocket extends longitudinally from one end of the bridge portion to an opposite end of the bridge portion,
wherein each of the at least one tube pocket includes a longitudinal opening extending along an entirety of the tube pocket disposed on one side of the bridge portion,
wherein each of the at least one tube pocket comprises a crimp feature configured to provide resistance to slide forces imparted on the at least one tube,
wherein the crimp feature includes an arcuate convex feature that protrudes radially inwardly into and circumferentially about a given tube pocket,
wherein the crimp feature includes an arcuate concave feature that recedes outwardly from and circumferentially about a given tube pocket, and
wherein the concave feature is opposite the convex feature such that a radial cross-sectional profile of a given tube pocket is asymmetrical; and
a fastener portion defining a central longitudinal axis disposed on a side of the bridge portion opposite the opening to the at least one tube pocket and extending therefrom, wherein the fastener portion is configured to engage the component via an opening, wherein the bridge portion and the fastener portion are fabricated as a unitary structure via an additive manufacturing technique.

12. The tube fastener of claim 11, wherein the bridge portion further comprises at least one tube retainer configured to prevent the at least one tube from exiting the at least one tube pocket.

13. The tube fastener of claim 12, wherein the at least one tube retainer comprises a divider and one or more wings.

14. The tube fastener of claim 13, wherein each of the one or more wings is resiliently connected to the divider and configured to deflect as the at least one tube is passed into the at least one tube pocket.

15. The tube fastener of claim 13, wherein each of the one or more wings defines one or more windows.

16. A tube fastener for securing at least one tube, the tube fastener comprising:
   a bridge portion; and
   at least one tube pocket formed in or on the bridge portion and configured to secure the at least one tube relative to the bridge portion,
   wherein each of the at least one tube pocket includes a tubular-shaped inner surface,
   wherein each of the at least one tube pocket extends longitudinally from one end of the bridge portion to an opposite end of the bridge portion,
   wherein each of the at least one tube pocket includes a longitudinal opening extending along an entirety of the tube pocket disposed on one side of the bridge portion,
   wherein each of the at least one tube pocket comprises a crimp feature configured to provide resistance to slide forces imparted on the at least one tube,
   wherein the crimp feature includes an arcuate convex feature that protrudes radially inwardly into and circumferentially about a given tube pocket,
   wherein the crimp feature includes an arcuate concave feature that recedes outwardly from and circumferentially about a given tube pocket, and
   wherein the concave feature is opposite the convex feature such that a radial cross-sectional profile of a given tube pocket is asymmetrical, and
   wherein the tube fastener is fabricated as a unitary structure via an additive manufacturing technique.

17. The tube fastener of claim 16, wherein the bridge portion further comprises at least one tube retainer configured to prevent the at least one tube from exiting the at least one tube pocket.

18. The tube fastener of claim 17, wherein the at least one tube retainer comprises a divider and one or more wings.

19. The tube fastener of claim 18, wherein each of the one or more wings is resiliently connected to the divider and configured to deflect as the at least one tube is passed into the at least one tube pocket.

20. The tube fastener of claim 18, wherein each of the one or more wings defines one or more windows.

* * * * *